United States Patent
Mori et al.

(10) Patent No.: US 6,674,961 B1
(45) Date of Patent: Jan. 6, 2004

(54) MAGNETIC RECORDING DEVICE AND METHOD, MAGNETIC REPRODUCTION DEVICE AND METHOD, AND TAPE RECORDING MEDIUM

(75) Inventors: Hiroya Mori, Kanagawa (JP); Yasutaka Kotani, Tokyo (JP); Kazuyuki Iesaka, Tokyo (JP); Hisao Osabe, Tokyo (JP); Masanori Kimura, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/471,699

(22) Filed: Dec. 23, 1999

(30) Foreign Application Priority Data

Dec. 25, 1998 (JP) .......................... 10-371058

(51) Int. Cl.[7] .............................................. H04N 5/926
(52) U.S. Cl. ........................................ 386/124; 386/46
(58) Field of Search ............................ 386/40, 35, 46, 386/52, 78–80, 95, 102, 124, 131; 360/13, 32, 48, 55, 77.15

(56) References Cited

U.S. PATENT DOCUMENTS

| | | | |
|---|---|---|---|
| 5,394,249 A | * 2/1995 | Shimoda et al. | 386/124 |
| 5,416,651 A | * 5/1995 | Uetake et al. | 386/95 |
| 5,699,471 A | * 12/1997 | Furuhata et al. | 386/40 |
| 6,496,646 B1 | * 12/2002 | Ohta | 386/46 |

FOREIGN PATENT DOCUMENTS

| | | |
|---|---|---|
| EP | 0 421 417 | 4/1991 |
| EP | 0 940 804 | 9/1999 |
| EP | 0 989 546 | 3/2000 |

OTHER PUBLICATIONS

Patent Abstracts of Japan vol. 015, No. 075 (P–1169), Feb. 21, 1991 & JP 02 294909 A (Mitsubishi Electric Corp), Dec. 5, 1990.

* cited by examiner

Primary Examiner—Thai Tran
Assistant Examiner—Christopher Onuaku
(74) Attorney, Agent, or Firm—Frommer Lawrence & Haug LLP; William S. Frommer; Dennis M. Smid

(57) ABSTRACT

In a magnetic recording device and method, a magnetic reproduction method and its method and a tape recording medium, the performance can be improved. In the case of successively and obliquely forming tracks along the longitudinal direction of a second magnetic tape having a width wider than a first magnetic tape and continuously recording recording data for at least two tracks in a digital recording format on each track, each track is to be formed at a predetermined track pitch set based on the recording time and the reproduction signal characteristic. Thereby, recording data based on the digital recording format which is applied to the first magnetic tape can keep a practically sufficient C/N ratio and can be recorded on the second magnetic tape for a long time. And thus, a magnetic recording device and method, a magnetic reproduction device and method, and a tape recording medium capable of improving the performance can be realized.

16 Claims, 9 Drawing Sheets

| ITEM | DIGITAL 8mm SYSTEM | | ANALOG 8mm SYSTEM | | DV SYSTEM | |
|---|---|---|---|---|---|---|
| MODE | SP | LP | SP | LP | SP | LP |
| DRUM DIAMETER mm | | 40 | | 40 | | 21.7 |
| NUMBER OF DRUM ROTATIONS PAL r.p.m. | | 4500 | | 1500 | | 9000 |
| NUMBER OF DRUM ROTATIONS NTSC r.p.m. | | 4500/1.001 | | 1800/1.001 | | 9000/1.001 |
| LEAD STILL ANGLE | | 4.885 | | 4.885 | | 9.15 |
| EFFECTIVE WRAP ANGLE | | 177 | | 180 | | 174 |
| TRACK PITCH PAL μm | 16.34 | 10.9 | 34.4 | 17.2 | 10 | 6.67 |
| TRACK PITCH NTSC μm | 16.34 | 10.9 | 20.5 | 10.2 | 10 | 6.67 |

FIG. 6

| ITEM | DIGITAL 8mm SYSTEM | | ANALOG 8mm SYSTEM | | DV SYSTEM | |
|---|---|---|---|---|---|---|
| MODE | SP | LP | SP | LP | SP | LP |
| TAPE SPEED mm/sec PAL | 14.369 | 9.590 | 20.051 | 10.058 | 9.424 | 6.288 |
| TAPE SPEED mm/sec NTSC | ↑/1.001 | ↑/1.001 | 14.345 | 7.186 | ↑/1.001 | ↑/1.001 |
| fn/2 FREQUENCY MHz | 20.93 | 20.93 | | | 20.93 | 20.93 |
| WHITE CLIPPING 220% MHz | | | 10.1 | 10.1 | | |
| RELATIVE SPEED m/sec PAL | 9.41 | 9.42 | 3.12 | 3.13 | 10.22 | 10.22 |
| RELATIVE SPEED m/sec NTSC | 9.40 | 9.40 | 3.75 | 3.76 | 10.21 | 10.21 |
| SHORTEST RECORDING WAVELENGTH μm PAL | 0.450 | 0.450 | 0.309 | 0.310 | 0.488 | 0.488 |
| SHORTEST RECORDING WAVELENGTH μm NTSC | 0.449 | 0.450 | 0.371 | 0.372 | 0.488 | 0.488 |

※fn = NYQUIST FREQUENCY

FIG. 7

MAGNETIC RECORDING DEVICE AND METHOD, MAGNETIC REPRODUCTION DEVICE AND METHOD, AND TAPE RECORDING MEDIUM

BACKGROUND OF THE INVENTION

1. Field of the Invention

This invention relates to a magnetic recording device and method, a magnetic reproduction device and method and a tape recording medium, and more particularly, is suitably applied to a camera-integrated video tape recorder.

2. Description of the Related Art

As a recording system of the digital video tape recorder, there are a digital video (DV) system (IEC 61834 helical scan digital video tape cassette recording system using 6.35 mm magnetic tape for consumers (525/60.625/50.1125/60 and 1250/50 systems)). In recent years, camera-integrated video tape recorders and table-top video tape recorders which correspond to this digital video system have come on the market.

In this digital video system, a magnetic tape to be used (hereinafter referred to DV tape) is 6.35 mm (=¼ inch) in width. And the width of this tape is narrower than that of the magnetic tape to be used in the analog 8 mm system (hereinafter referred to as 8 mm video tape), that is widely used as the recording system of the related analog video tape recorder (IEC 60843 helical scan video tape cassette recording system using 8 mm magnetic tape for consumer).

In the digital video system, video/audio signal to be recorded is compressed and recording density is enhanced, which cause an advantage that recording can be performed with high image quality for a long time.

Although there is no compatibility between the digital video system and the analog 8 mm system, it is considered that image and sound could be recorded for a long time with high quality if video/audio signal in the data format of the digital video system could be recorded on the 8 mm video tape that is wider than the DV tape, for example.

In this case, it is considered that if the video tape recorder to conduct such recording/reproduction can be constructed by using such as manufacturing equipment and various devices for video tape recorders based on the current analog 8 mm system, such a video tape recorder can be constructed inexpensively by utilizing resources effectively.

SUMMARY OF THE INVENTION

In view of the foregoing, an object of this invention is to provide a magnetic recording device and method, and a magnetic reproduction device and method and a tape-shaped recording medium capable of improving the performance.

The foregoing object and other objects of the invention have been achieved by the provision of a magnetic recording device which comprises a recording data generating means for generating recording data in the digital recording format which is applied to a first magnetic tape having a predetermined width, and a recording means for successively and obliquely forming tracks along the longitudinal direction of a second magnetic tape which is wider in width than the first magnetic tape and for continuously recording recording data for at least two tracks in the digital recording format on each track. The recording means forms each track at a predetermined track pitch set based on the recording time and the reproduction signal characteristic.

As a result, in this magnetic recording device, the recording data based on the digital recording format which is applied to the first magnetic tape can keep practically sufficient C/N ratio and can be recorded on the second magnetic tape for a long time.

Furthermore, the present invention provides a magnetic recording method which comprises a first step of generating recording data in the digital recording format which is applied to a first magnetic tape having a predetermined width, and a second step of successively and obliquely generating tracks in the longitudinal direction of a second magnetic tape which is wider in width than the first magnetic tape and of continuously recording the recording data for at least two tracks in the digital recording format on each track. And in the second step, each track is to be formed at a predetermined track pitch set based on the recording time and the reproduction signal characteristic.

As a result, according to this magnetic recording method, the recording data based on the digital recording format which is applied to the first magnetic tape can keep practically sufficient C/N ratio and can be recorded on the second magnetic tape for a long time.

Furthermore, the present invention provides a magnetic reproduction device which comprises a reproduction means for reproducing recording data from a second magnetic tape which is wider in width than a first magnetic tape on which the recording data based on the digital recording format which is applied to the first magnetic tape having the predetermined width are recorded. And this reproduction means continuously reproduces the recording data for at least two tracks in the digital recording format from each track sequentially and obliquely formed along the longitudinal direction of the second magnetic tape at a predetermined track pitch set based on a recording time and a reproduction signal characteristic.

As a result, in this magnetic reproduction device, the recording data based on the digital recording format which is applied to the first magnetic tape can keep practically sufficient C/N ratio and can be reproduced from the second magnetic tape for a long time.

Furthermore, the present invention provides a magnetic reproduction method, in which in the case of reproducing recording data from a second magnetic tape which is wider in width than a first magnetic tape on which the recording data based on the digital recording format which is applied to a first magnetic tape having a predetermined width are recorded, the recording data for at least two tracks in the digital recording format is continuously reproduced from each track successively and obliquely formed at a predetermined track pitch set based on the recording time and the reproduction signal characteristic along the longitudinal direction of the second magnetic tape.

As a result, in this magnetic reproduction method, the recording data based on the digital recording format which is applied to the first magnetic tape can keep practically sufficient C/N ratio and can be reproduced from the second magnetic tape for a long time.

Furthermore, the present invention provides a tape recording medium formed of a second magnetic tape which is wider in width than a first magnetic tape on which recording data based on the digital recording format which is applied to a first magnetic tape having a predetermined width is recorded, tracks are successively and obliquely formed at a predetermined track pitch set based on the recording time and the reproduction signal characteristic along the longitudinal direction of the second magnetic tape, and recording data for at least two tracks in the digital recording format is to be continuously recorded as a single track.

As a result, in this tape recording medium, the recording data based on the digital recording format which is applied to the first magnetic tape can keep a practically sufficient C/N ratio and can be recorded for a long time.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6 and 7 are tables showing the specifications of various recording systems;

DETAILED DESCRIPTION OF THE EMBODIMENT

Preferred embodiments of this invention will be described with reference to the accompanying drawings:

(1) Recording System According to the Embodiment of the Present Invention

The recording system according to the present invention will be described below in comparison with the current analog, 8 mm system and the related digital video system. The recording system according to the present invention is a system to record video/audio signal in the data format of the digital video system on a 8 mm video tape, and hereinafter referred to as a digital 8 mm system.

Figure 1:
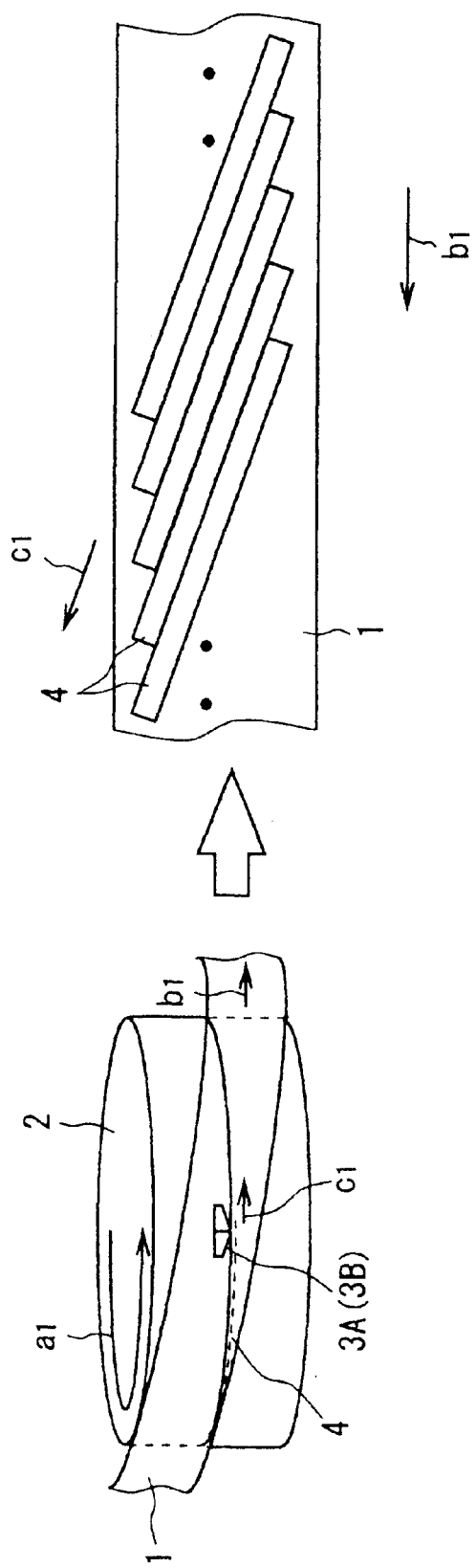
FIG. 1 is a schematic diagram explaining the recording format in the analog 8 mm system.

Firstly, as shown in FIG. 1, in the analog 8 mm system, a rotary drum 2 having a diameter of 40 mm is being revolved at the speed of 1800/1.001 r.p.m in the NTSC system and at the rotation speed of 1500 r.p.m. in the PAL (phase alternation by line) system (in the direction as shown by an arrow $a_1$), so as to record the video/audio signal on the 8 mm video tape 1.

In this case, tow magnetic heads 3A and 3B having different azimuth angles are loaded at the positions opposite to each other by 180°. Thus, the two magnetic heads 3A and 3B alternately scan at a predetermined angle with respect to the running direction (arrow $b_1$) of the 8 mm video tape 1. And as a result, a track 4 is successively and obliquely formed in the longitudinal direction of the 8 mm video tape 1 as shown in FIG. 1.

Then, in the analog 8 mm system, video/audio signal is recorded on the 8 mm video tape 1 forming a single track 4 for one field as described above.

Figure 2:
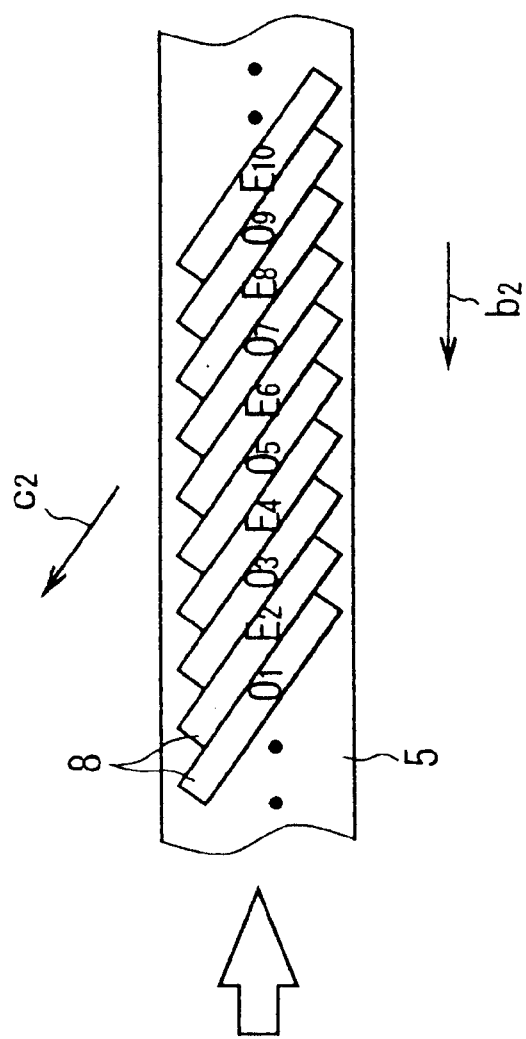
FIG. 2 is a schematic diagram explaining the recording format in the related digital video system.
Figure 2:
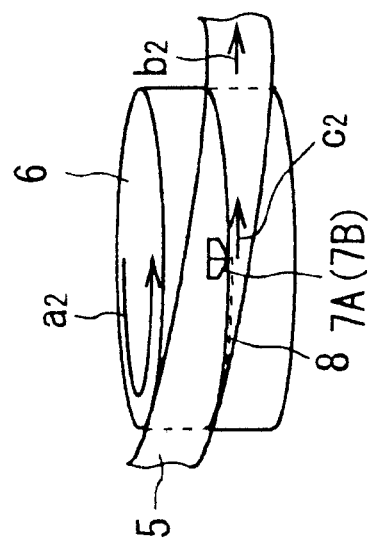

Furthermore, in the digital video system, as shown in FIG. 2,. DV data is recorded on a DV tape 5 having a width of 6.35 mm by revolving a rotary drum 6 having a diameter of 21.7 mm at the rotation speed of 9000/1.001 r.p.m. in the NTSC system and at the rotation speed of 9000 r.p.m. in the PAL system (in the direction of an arrow $b_2$)

Also in this case, two magnetic heads 7A and 7B having different azimuth angles are loaded at positions opposite to each other by 180°. Thus, the two magnetic heads 7A and 7B successively and alternately scan at a predetermined angle with respect to the running direction (arrow $b_2$) of the DV tape 5. And as a result, a track 8 will be successively and obliquely formed along the longitudinal direction of the DV tape 5 as shown in FIG. 2.

Then, in this digital video system, if tracks 8 formed by one magnetic head 7A are taken to be odd tracks, $O_1$, $O_3$, ..., and the tracks 8 formed by the other magnetic head 7B are taken to be even tracks $E_2$, $E_4$, ..., the video/audio signal for one frame is divided into 5 odd tracks $O_1$, $O_3$, ... and 5 even tracks $E_2$, $E_4$, ..., i.e., 10 tracks in total and recorded in the NTSC system, while in the PAL system, the video/audio signal for one frame is divided into 6 odd tracks $O_1$, $O_4$, ... and 6 even tracks $E_2$, $E_4$, ..., i.e., 12 tracks 8 in total and recorded.

Figure 3:
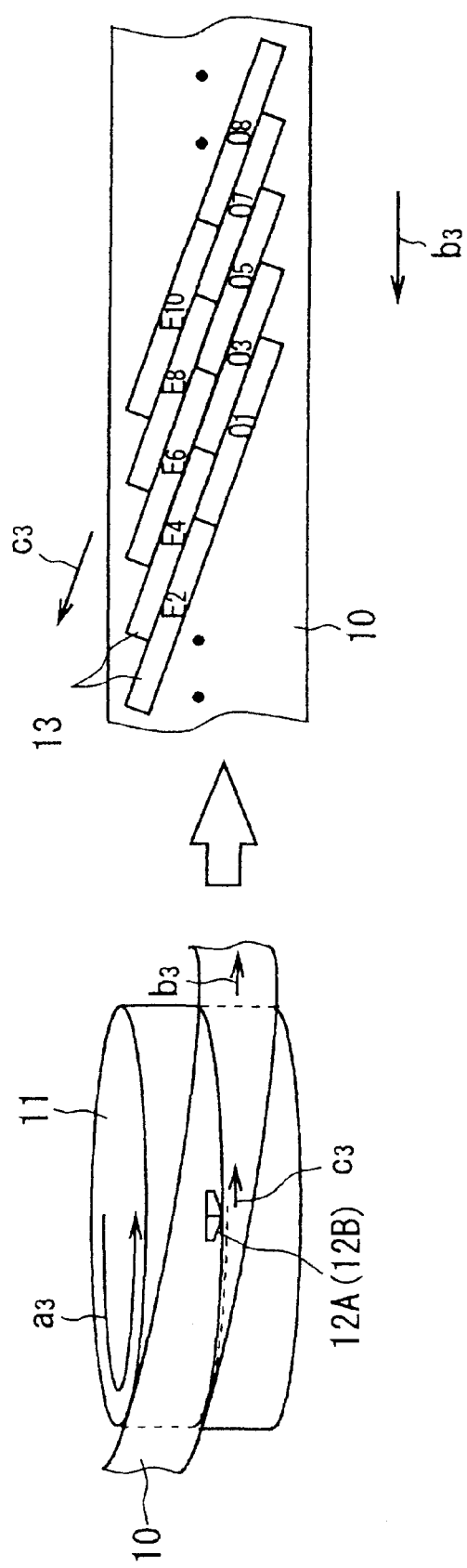
FIG. 3 is a schematic diagram explaining the recording format in the digital 8 mm system.

On the other hand, in the digital 8 mm system according to the present invention, as shown in FIG. 3, video/audio signal in the data format of the digital video system is recorded on a 8 mm video tape 10 by rotating a rotary drum 11 having the same diameter (40 mm) as the analog 8 mm system, at the rotation speed of 4500/1.001 r.p.m. in the NTSC system and at the rotation speed of 4500 r.p.m. in the PAL system (in the direction shown by an arrow $a_3$).

In this case, two magnetic heads 12A and 12B having different azimuth angles are provided on the positions opposite to each other by 180° on the rotary drum 11. Therefore, the two magnetic heads 12A and 12B successively and alternately scan the 8 mm video tape 10 at a predetermined angle with respect to the running direction (arrow mark $b_3$). And as a result, a track 13 is successively and obliquely formed in the longitudinal direction of the 8 mm video tape as shown in FIG. 3.

At this point, in this digital 8 mm system, data for two tracks in the digital video system is continuously recorded on a single track 13 of the 8 mm video tape as it is as the data pattern of the digital video system. More specifically, in the digital 8 mm system, data are recorded as a single track 13 without changing the contents of the data but pairing the data of odd track $O_1$, $O_3$, ... and the data of even track $E_2$, $E_4$, ... in the digital video system.

For example, in the digital 8 mm system, pairing the data of odd track $O_1$, and the data of even track $E_2$ in the digital video system, the data are continuously recorded on a single track 13. Then, paring the data of odd track $O_3$ and the data of even track $E_4$ in the digital video system, data are continuously recorded on the next track 13. And then, successively paring the data of the following two tracks 8 (FIG. 2) in the same manner as above, data are successively paired and recorded on a single track 13.

Accordingly, in the digital 8 mm system, the video/audio signal for one frame is recorded on the 8 mm video tape 10 by being divided into five tracks 13 in the NTSC system and into six tracks 13 in the PAL system.

Figure 4:
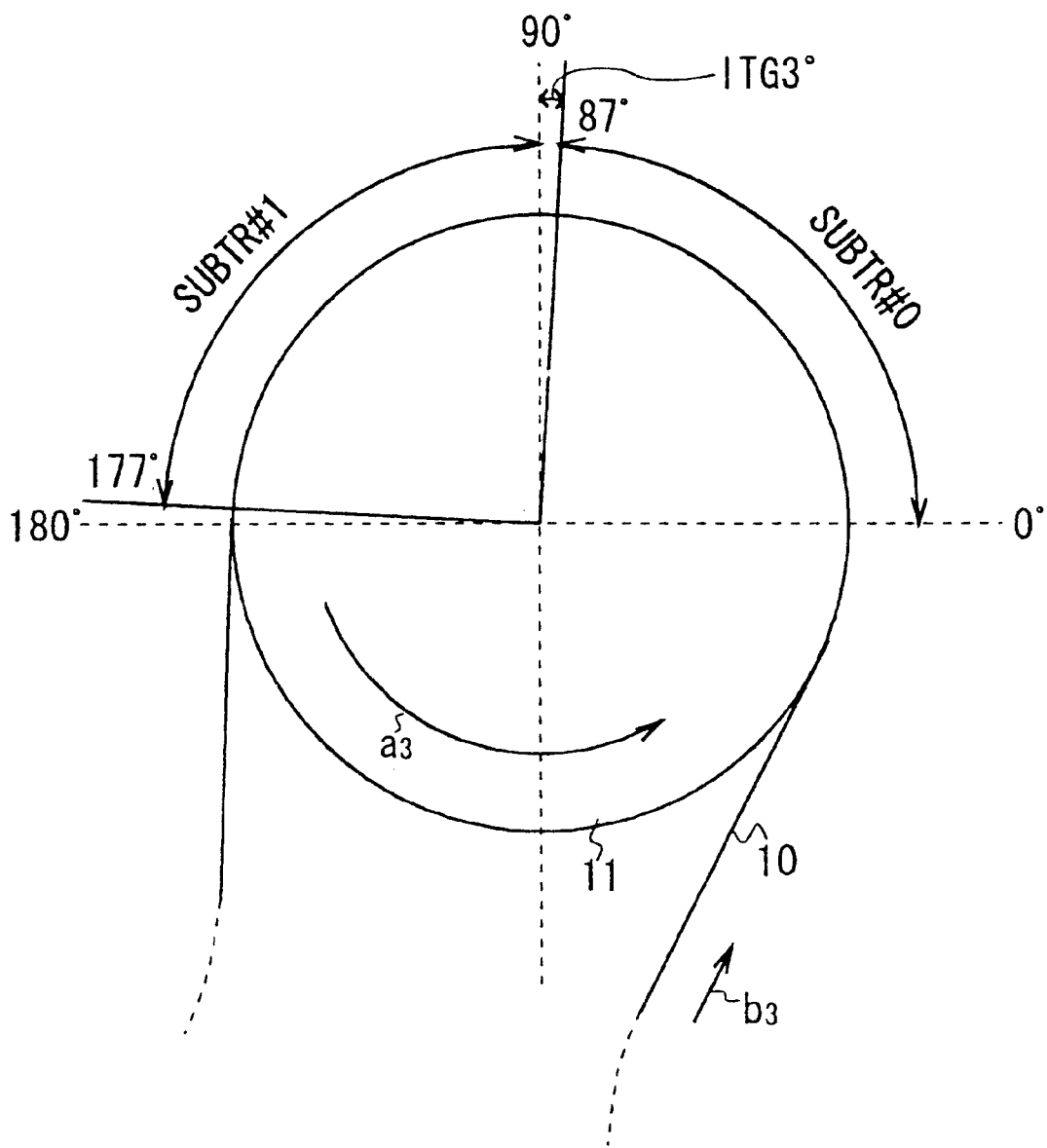
FIGS. 4 and 5 are schematic diagrams concretely explaining the digital 8 mm system.
Figure 5:
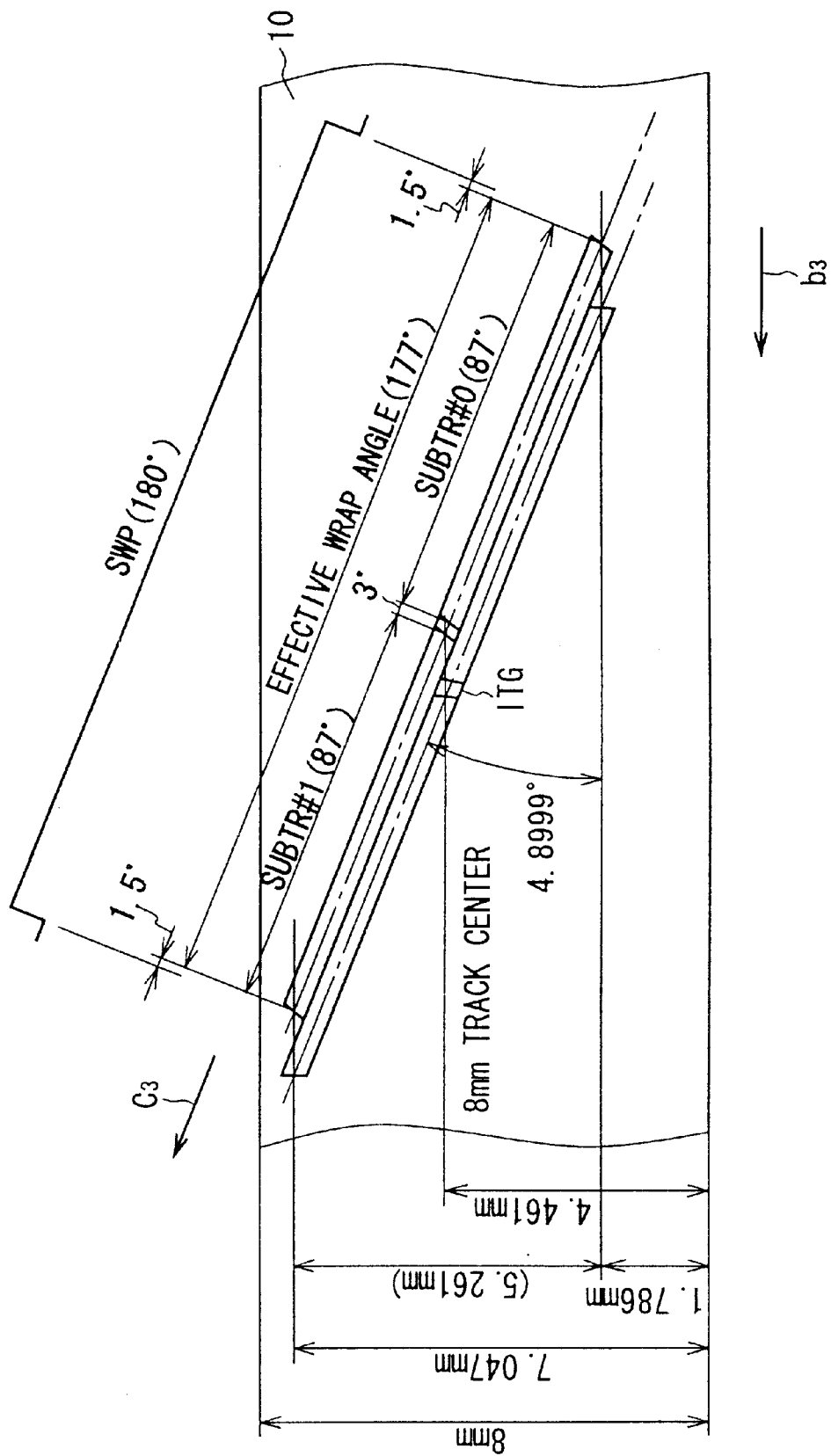

In this connection, detailed recording format of this digital 8 mm system will be shown in FIGS. 4 and 5.

It is apparent from these FIGS. 4 and 5, effective wrap angle is selected to be 177° in the digital 8 mm system. And in this effective wrap angle, two sub tracks SubTr #0, SubTr #1 are provided having a gap ITG (inter track gap) of 3° therebetween.

At this point, each wrapping angles of the sub tracks SubTr #0 and SubTr #1 with respect to the rotary drum 11 is set in the domain of 87°, and data for one track in the digital video system can be recorded as it is as the data format of the digital video system. As a result, in the effective. wrap angle, the data of odd tracks $O_1, O_3, \ldots$ and even tracks $E_2, E_4, \ldots$ in the digital video system are successively recorded as it is one track by one track.

Furthermore, in this digital 8 mm system, two magnetic heads provided on the rotary drum 11 are switched by the switching pulse SWP which is generated in synchronism with the rotation phase of the rotary drum 11.

More specifically, at the time when the data recording by one magnetic head 12A (e.g., Ach) in the effective wrap angle is completed, the switching pulse SWP is switched, and the data recording by the other magnetic head 12B (e.g., Bch) in the effective wrap angle is started.

This switching pulse SWP is switched whenever the rotary drum 11 rotates 180°. Thus, a margin of 1.5° occurs at the preceding stage of the effective wrap angle.

In this connection, the specification of the digital 8 mm system according to the present invention will be shown more specifically in FIGS. 6 and 7 referring to the NTSC system and the PAL system. Specifications of the analog 8 mm system and the conventional digital video system will be also shown for comparison.

As described above, in the digital 8 mm system, since data for two tracks in the digital video system are continuously recorded on the 8 mm video tape 10 as a single track with the data pattern as it is, the tape area can be effectively utilized and images of higher quality can be recorded and reproduced for a long time.

(2) Construction of Magnetic Head According to the Embodiment of the Present Invention At this point, let us consider regarding the optimum value of track pitch of each track to be formed on the 8 mm video tape 10 in order that the video/audio signal in the data format of the digital video system for 60 minutes can be recorded/reproduced on the 8 mm video tape 10 for 120 minutes according to the digital 8 mm system.

In this case, in the digital 8 mm system, a video/audio signal for one frame is divided into five tracks and recorded by rotating the rotary drum having a diameter of 40 mm at the rotation speed of 4500 r.p.m. in the NTSC standard mode (SP mode).

At this point, where the tape forward speed is Ts; the rotation speed of the rotary drum is Rs; the number of tracks to be recorded during one rotation of the rotary drum is Nt; the track angle is θr; and the constant number K is π/180, the track pitch is obtained by the following equation (1):

$$TP = \frac{T_s}{R_3 \times N_t} \times \sin(K \times \theta_r) \quad (1)$$

Here, in the analog 8 mm system, at the time of NTSC system standard mode (SP mode), a video/audio signal is recorded on the 8 mm video tape by forming a single track at a track pitch of 20.5 μm per one field by revolving the rotary drum having a diameter of 40 mm at the rotation speed of 1800 r.p.m.

Accordingly, the track pitch in the digital 8 mm system is set by determining the tape forward speed. Normally, in the analog 8 mm system and the digital video system, not only the standard mode (SP mode) but also the long-time mode (LP mode) can be set, and the data can be recorded/reproduced in the time 3/2 times of the standard mode.

Thus, in the digital 8 mm system, when it is set to the long-time mode (LP mode) and if the tape forward speed is set to 2/3 times of the standard mode (SP mode), a video/audio signal in the data format of the digital video system for 1.5 hours can be recorded and reproduced on the 120-minute 8 mm video tape.

Figure 8:
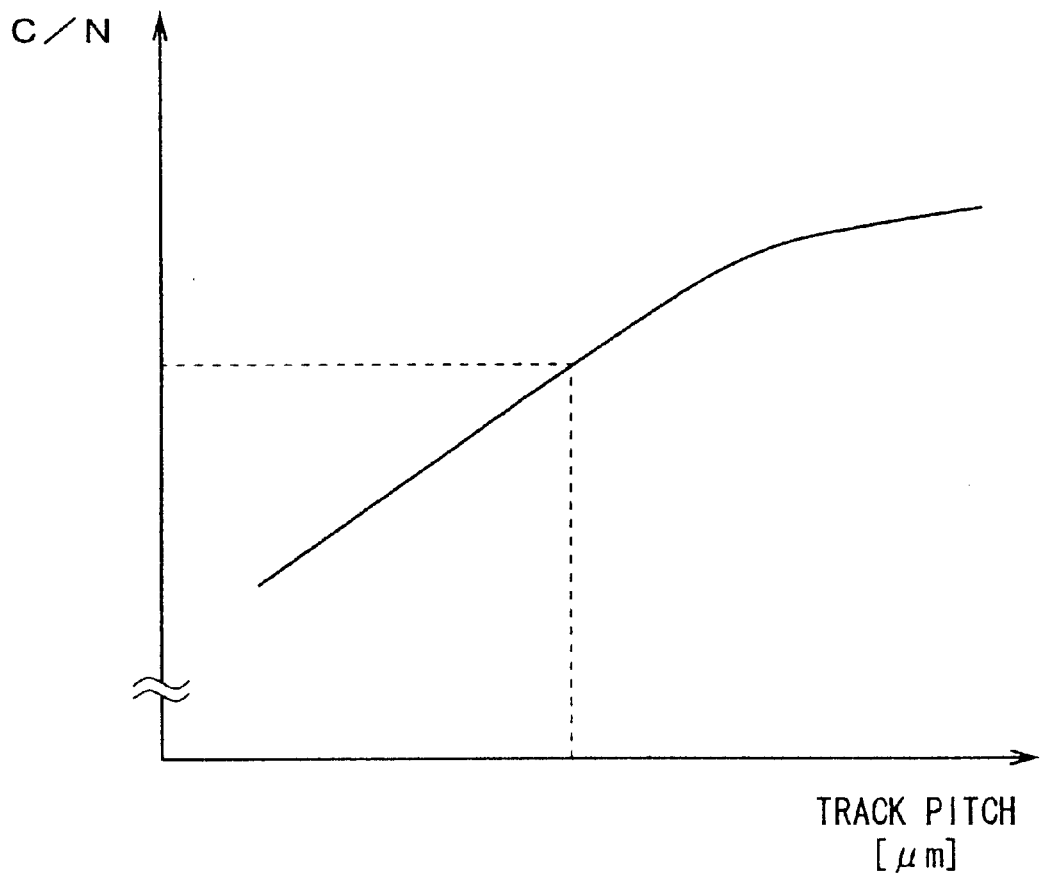
FIG. 8 is a graph showing the relationship between the track pitch and the C/N ratio of recording and reproduction.

At this point, if the track pitch between tracks in the 8 mm video tape becomes narrow, cross-talk from the neighboring track increases and the C/N ratio decreases (error rate increases). And the relationship between the track pitch and the C/N characteristic of recording/reproduction can be shown as FIG. 8.

In the analog 8 mm system, the track pitch is 20.5 μm, while in the digital video system, it is 10 μm. According to FIG. 8, the larger the C/N ratio becomes, the better it is, i.e., the more it is ideal. However, when the track pitch becomes to be a prescribed width, the C/N ratio is saturated at the prescribed value.

Accordingly, even when the tape running speed is set to the long-time mode (i.e., 2/3 times of the standard mode), it is necessary to set the track pitch so that it does not become under 10 μm in the digital video system.

Furthermore, if the track pitch of each track (equivalent to the track width) in the 8 mm video tape becomes wider, the cross-talk from the neighboring track decreases and accordingly, the recording time, on the 8 mm video tape becomes shorter. Therefore, it is necessary that the tape recording time does not become shorter than 60-minutes as in the case of the standard mode in the digital video system.

Then, according to the embodiment of the present invention, by setting the track pitch to be approximately 16.4 μm, the recording/reproduction C/N ratio can be obtained at the practically sufficient level and at the same time, the long-time recording, as in the case of the standard mode of the digital video system, can be realized.

In practice, in the equation (1), if the tape forward speed Ts is taken to be 28.69005314 mm, the rotation speed of the rotary drum Rs is taken to be 75 Hz (4500 r.p.m.), the number of tracks to be recorded per revolution of the rotary drum Nt is taken to be 2, and the track angle θr is taken to be 4.899897649, the track pitch TP becomes 0.0163371 mm, i.e., approximately 16.34 μm.

Figure 9:
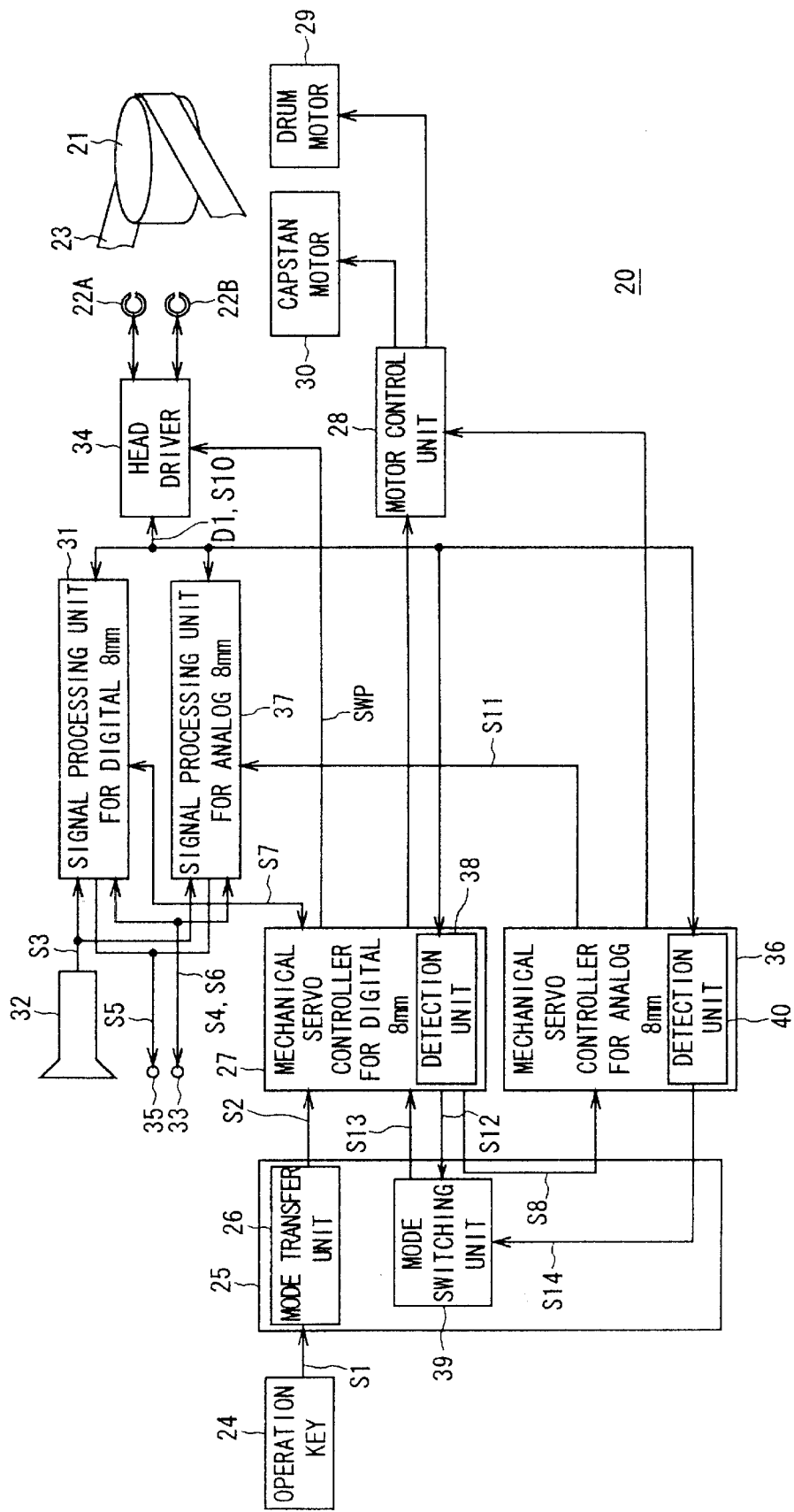
FIG. 9 is a block diagram showing the construction of a video tape recorder according to the present invention.

(3) Construction of Video Tape Recorder According to the Embodiment of the Present Invention FIG. 9 shows a camera-integrated video tape recorder 20 according to the present invention. In this video tape recorder 20, the rotary drum 21 is provided with two magnetic heads 22A and 22B having different azimuth angles at the positions opposite to each other by 180°. And a video/audio signal is recorded/reproduced on/from a 8 mm video tape 23 by these two magnetic heads 22A and 22B according to the digital 8 mm system, and the video/audio signal recorded on the 8 mm video tape 23 with the analog 8 mm system can be reproduced.

In practice, in this video tape recorder 20, an operation key 24 for selecting an operation mode is provided at the predetermined position of the body. And by operating the operation key 24, either one of operation modes, recording mode or reproduction mode of the digital 8 mm system, or reproduction mode with the analog 8 mm system, can be selected.

Then, in this video tape recorder 20, when one operation mode is selected by operating this operation key 24, a mode selection signal Si corresponding to this selected mode is given to a mechanical servo controller for digital 8 mm 27 as an operation mode specification signal S2 via the mode transfer unit 26 of the control unit 25.

For example, when the recording mode of the digital 8 mm system is specified, the mechanical servo controller for digital 8 mm 27, by controlling a drum motor 29 and a capstan motor 30 using a motor control unit 28, rotates the rotary drum 21 at the rotation speed of 4500/1.00 r.p.m. in the NTSC system and at the rotation speed of 4500 r.p.m. in the PAL system, runs the 8 mm video tape 23 loaded on the rotary drum 21 at the running speed of 14.348/1.001 mm/sec at the time of standard mode of the NTSC system, and at the running speed of 9.590 mm/sec during the long-time mode.

Furthermore, the mechanical servo controller for digital 8 mm 27 controls a signal processing unit for digital 8 mm 31. At this time, the signal processing unit for digital 8 mm 31 is supplied with a video signal S3 of analog waveform from an image pickup unit 32 comprised of lens and a charge coupled device (CCD). And also this mechanical servo controller for digital 8 mm 27 is supplied with an audio signal S4 of analog waveform from a microphone (not shown in FIG.) via an audio input/output terminal 33.

Thus, under the control of the mechanical servo controller for digital 8 mm 27, the signal processing unit for digital 8 mm 31 successively applies the prescribed recording signal processing, such as analog/digital conversion processing, coding processing, error correction processing and overlapping processing and modulation processing of the ATF (automatic track following) signal, according to the digital video system to the supplied video signal S3 and audio signal S4, and transmits the resultant video/audio data in the data format of the digital video system (hereinafter referred to as DV data) D1 to a head driver 34.

Then, the head driver 34 successively transmits the supplied DV data D1, based on the switching pulse SWP from the mechanical servo controller for digital 8 mm 27, every data for two tracks in the digital video system, by alternately switching the magnetic heads 22A and 22B, while the magnetic heads 22A and 22B run on the 8 mm video tape 23.

As a result, this DV data D1 is successively recorded on the 8 mm video tape 23 every data for two tracks in the digital video system as a single track at the track pitch of 16.34 μm by either magnetic head 22A, 22B.

Thus, in this video tape recorder 20, at the time of the recording mode, the video signal S3 to be transmitted from the image pickup unit 32 and the audio signal S4 to be transmitted from the microphone can be recorded on the 8 mm video tape 23 with the digital 8 mm system described in FIG. 3.

On the other hand, when the reproduction mode in the digital 8 mm system is specified based on the operation mode specification signal S2, the mechanical servo controller for digital 8 mm 27, by controlling the drum motor 29 and the capstan motor 30 with the motor control unit 28, rotates the rotary drum 21 at the same rotation speed as the recording mode by said digital 8 mm system, and runs the 8 mm video tape 23 at the same running speed as the recording mode in the digital 8 mm system.

As a result, the DV data D1 for a single track in the 8 mm video tape 23 (for two tracks in the digital video system) is successively reproduced whenever the rotary drum 21 makes a turn by either magnetic head 22A, 22B loaded on the rotary drum 21 and this is supplied to the digital 8 mm signal processing unit 31 via the head driver 34.

Then, the signal processing unit for digital 8 mm 31 drives under the control of the mechanical servo controller for digital 8 mm 27, applies the prescribed reproduction signal processing according to the digital video system to the DV data, such as modulation processing, error correction processing, demodulation processing, and outputs the resultant video signal to outside via the image input/output terminal 35 as a reproduced video signal S5 and also outputs the resultant audio signal to outside via the audio input/output terminal 33 as a reproduced audio signal S6.

At this point, the signal processing unit for digital 8 mm 31 extracts an ATF signal S7 superimposed on the DV data D1 and outputs this to the mechanical servo controller for digital 8 mm 27. Then, the mechanical servo controller for digital 8 mm 27 controls the rotation speed of the capstan motor 30 with the motor control unit 28 based on this ATF signal for the tracking control.

With this arrangement, at the time of reproduction mode in the digital 8 mm system, the video tape recorder 20 can reproduce the DV data D1 recorded on the 8 mm video tape 23 with the digital 8 mm system described above in FIG. 3 and can output it.

On the other hand, when the reproduction mode in the analog 8 mm system is specified based on the operation mode specification signal S2, for example, the mechanical servo controller for digital 8 mm 27 outputs a mode transfer signal S8 for making a notification of this, to the mechanical servo controller for analog 8 mm 36 via the control unit 25.

At this point, the mechanical servo controller for analog 8 mm 36, by controlling the drum motor 29 and the capstan motor 30 with the motor control unit 28 based on the mode transfer signal S8, rotates the rotary drum 21 at the speed of 1800/1.00 r.p.m. in the NTSC system and at the rotation speed of 1800 r.p.m. in the PAL system, and runs the 8 mm video tape 23 at the running speed of 14.354 mm/sec at the time of standard mode and at the running speed of 7.186 mm/sec at the time of long-time mode in the NTSC system, and on the other hand, in the PAL system, runs it at the running speed of 20.051 mm/sec at the time of standard mode and at the running speed of 10.058 mm/sec during the long-time mode.

As a result, every time when the rotary drum 21 makes a turn, the video/audio signal S10 recorded on the 8 mm video tape 23 with the analog 8 mm system is sequentially reproduced one track by one track by either magnetic head 22A, 22B and this is supplied to the signal processing unit for analog 8 mm 37 via the head driver 34.

At this point, under the control of the mechanical servo controller for analog 8 mm 36, the signal processing unit for analog 8 mm 37 applies the predetermined signal processing according to the analog 8 mm system to the supplied video/audio signal S10, and outputs the resultant analog waveform video signal to the outside as a reproduced video signal S5 via the video input/output terminal 35 and also outputs the resultant analog waveform audio signal to the outside as a reproduced audio signal S6 via the audio input/output terminal 33.

Furthermore, at this point, the signal processing unit for analog 8 mm 37 extracts an ATF signal S11 superimposed on the video/audio signal S10, and transmits this to the mechanical servo controller for analog 8 mm 36. Then, based on this ATF signal S11, the mechanical servo controller for analog 8 mm 36 controls the rotation speed of the capstan motor 30 with the motor control unit 28 for the tracking control.

With this arrangement, at the time of reproduction mode according to the analog 8 mm system, this video tape recorder 20 can reproduce the video/audio signal recorded on the 8 mm video tape 23 with the analog 8 mm system and output this.

Note that, in the case of this video tape recorder 20, at the time of reproduction mode according to the digital 8 mm system, outputs of the head driver 34 are supplied to the analog 8 mm signal detection unit 38 of the mechanical servo controller for digital 8 mm 27.

Then, at this point, the analog 8 mm signal detection unit 38 constantly monitors the output of this head driver 34. And when the analog 8 mm signal detection unit 38 detects a signal of the analog 8 mm system (i.e., video/audio signal S10), it transmits an analog 8 mm detection signal S12 to the mode switching unit 39 of the control unit 25 to inform it of this detection. Moreover, when the analog 8 mm detection signal S12 is supplied, the mode switching unit 39 transmits a mode switching signal S13 corresponding to this to the mechanical servo controller for digital 8 mm 27.

Furthermore, when the mode switching signal S13 is supplied, the mechanical servo controller for digital 8 mm 27 stops the signal processing operation of the signal processing unit for digital 8 mm 31 and also stops the control of the drum motor 29 and the capstan motor 30 with the motor control unit 28 and moreover, it transmits a mode transfer signal S8 to the mechanical servo controller for analog 8 mm 36 via the control unit 25.

Then, the mechanical servo controller for analog 8 mm 36, by controlling the drum motor 29 and the capstan motor 30 based on the supplied mode transfer signal S8, rotates them as in the case of reproduction mode of the analog 8 mm system, and controls the signal processing unit for analog 8 mm 37 to start the same signal processing operation as in the case of reproduction mode in the analog 8 mm system.

Accordingly, in this video tape recorder 20, at the time of reproduction mode in the digital 8 mm system, when the signal of the analog 8 mm system is reproduced, the operation mode is switched to the reproduction mode of the analog 8 mm system.

Furthermore, also in this video tape recorder 20, at the time of reproduction mode of the analog 8 mm system, outputs of the head driver 34 are given to the digital 8 mm signal detection unit 40 of the mechanical servo controller for analog 8 mm 36.

Then, at this point, the digital 8 mm signal detection unit 40 constantly monitors the outputs of the head driver 34, and when detecting the signal of the digital 8 mm system (i.e., DV data D1), it transmits a digital 8 mm detection signal S14 to the mode switching unit 39 of the control unit 25 to inform it of this detection. Moreover, when the digital 8 mm detection signal S14 is supplied, the mode switching unit 39 transmits the corresponding mode switching signal S13 to the mechanical servo controller for digital 8 mm 27.

Furthermore, when the mode switching signal S13 is given, the mechanical servo controller for digital 8 mm 27 transmits the mode transfer signal S8 to the mechanical servo controller for analog 8 mm 36 via the control unit 25.

As a result, the mechanical servo controller 36 for analog 8 mm 36 stops the signal processing operation by controlling the signal processing unit for analog 8 mm 37 based on the mode transfer signal S13, and also stops the controls of the drum motor 29 and the capstan motor 30 with the motor control unit 28.

Furthermore, at this point, the mechanical servo controller for digital 8 mm 27, by controlling the drum motor 29 and the capstan motor 30 with the motor control unit 28, rotates these in the same manner as in the case of reproduction mode with the digital 8 mm system. And on the other hand, the mechanical servo controller for digital 8 mm 27 controls the signal processing unit for digital 8 mm 31 to start the same signal processing operation as in the case of reproduction mode with the digital 8 mm system.

Thus, in this video tape recorder 20, at the time of reproduction mode, when a signal of the digital 8 mm system is reproduced, the operation mode is to be switched to the reproduction mode with the digital 8 mm system.

(4) Operation and Effects of the Embodiment

According to the foregoing construction, in the digital video tape recorder 20, at the time of recording mode of the digital 8 mm system, the video/audio data in the data format of the digital video system is successively recorded on the 8 mm video tape 23 by two magnetic heads 22A and 22B loaded on the rotary drum by one track by one track (every two tracks in the digital video system) alternately at the track pitch of 16.34 $\mu$m.

Accordingly, in this video tape recorder 20, since the video/audio signal is recorded at the track pitch of 16.34 $\mu$m, the practically sufficient C/N ratio can be kept at the time of recording mode and the reproduction mode. In addition, the DV data D1 can be recorded on the 8 mm video tape 23 with the digital 8 mm system for the same period of time (60 minutes) as in the standard mode of the digital video system.

According to the foregoing construction, since the track pitch in the digital 8 mm system is set to 16.34 $\mu$m, the video tape recorder 20 capable of obtaining practically sufficient C/N ratio and recording the DV data D1 on the 8 mm video tape 23 with high quality for a long time can be realized.

(5) Other Embodiments

In the aforementioned embodiment, the present invention is applied to the camera-integrated video tape recorder capable of recording signals of the analog 8 mm system and the digital 8 mm system. However, the present invention is not only limited thereto but also it can be widely applied to various other magnetic recording devices for recording the recording data based on the digital recording format which is applied to the first magnetic tape, by forming tracks onto the second magnetic tape at the predetermined track pitch set based on the recording time and the signal characteristic.

In this case, as long as a tape is a magnetic tape for recording recording data comprised of a digital signal in the digital recording format, various magnetic tapes other than the DV tape 5 can be used as the first magnetic tape. Moreover, as long as a tape is a magnetic tape for recording an analog signal in the data format according to the prescribed analog recording system, various magnetic tapes other than the 8 mm video tape 23 can be used as the second magnetic tape.

Furthermore, in the aforementioned embodiment, the signal processing unit for digital 8 mm 31 is applied as the recording data generating means for generating recording data based on the data format of the digital video system (digital recording format) which is applied to the DV tape (the first magnetic tape) 5 having the prescribed tape width. However, the present invention is not only limited thereto but also various other recording data generating means can be applied.

Furthermore, in the aforementioned embodiment, tracks are successively and obliquely formed along the longitudinal direction of the 8 mm video tape (the second magnetic tape) 23 having a width wider than the DV tape 5 and the head driver 34, the magnetic heads 22A and 22B, and the mechanical servo controller for digital 8 mm 27 are applied as the recording means for successively recording recording data for at least two tracks in the digital recording format on each track. However, the present invention is not only limited thereto this but also, in short, as long as tracks can be formed at a predetermined track pitch set based on the recording time and the signal characteristic, recording means having various other constructions can be widely applied.

In such cases, the recording time can be set longer than the recording time of the DV tape 5 (60 minutes). Moreover, concerning the signal characteristic, as long as the track pitch of each track to be formed on the DV tape 5 is more than 10 μm and the practically sufficient C/N ratio can kept when the width of track pitch to be set is set to 2/3 times, various characteristics can be set.

Furthermore, in the aforementioned embodiment, the head driver 34, the magnetic heads 22A and 22B, and the signal processing unit for digital 8 mm 31 are applied as the reproduction means for reproducing the recording data from the 8 mm video tape 23 having a width wider than the DV tape 5 on which recording data based on the digital recording format which is applied to the DV tape S is recorded. However, the present invention is not only limited thereto but also, in short, as long as recording data for at least two tracks in the digital recording format can be reproduced continuously onto each track formed at the predetermined track pitch set based on the recording time and reproduction signal characteristic, reproduction means having various other constructions can be widely applied.

In this case, in setting the track pitch to 16.34 μm, in addition to determine the recording time and reproduction signal characteristic, the track width, the number of wire windings, head gap width and the azimuth, etc. of the magnetic heads 22A and 22B can be adjusted.

Furthermore, in the aforementioned embodiment, the track pitch (16.34 μm) is set based on the tape forward speed of the 8 mm video tape 23, the track angle of each track with respect to the longitudinal direction of 8 mm video tape 23, the rotation speed of the rotary drum 21 on which magnetic heads 22A and 22B are loaded, and the number of tracks to be recorded per rotation of the rotary drum 21 as shown in the equation (1). However, the present invention is not only limited thereto but also, as long as the track pitch can be set to 16.34 μm by setting the lower limit based on the recording time as well as setting the upper limit based on the reproduction signal characteristic, a track pitch can be selected in utilizing various other methods.

According to the present invention as described above, tracks are successively and obliquely formed in the longitudinal direction of the second magnetic tape having a width wider than the first magnetic tape, the recording means for successively recording recording data for at least two tracks in the digital recording format on each track, and each track is to be formed at the predetermined track pitch set based on the recording time and the reproduction signal characteristic by the recording means. Thereby, the recording data based on the digital recording format which is applied to the first magnetic tape can keep a practically sufficient C/N ratio and can be recorded for a long time on the second magnetic tape. Thus, the magnetic recording device capable of improving the performance can be realized.

Furthermore, according to the present invention, in the magnetic recording method, tracks are successively and obliquely formed along the longitudinal direction of the second magnetic tape having a width wider than the first magnetic tape, each track is formed at the predetermined track pitch set based on the recording time and the reproduction signal characteristic in the case of successively recording the recording data for at least two tracks in the digital recording format on the said each track. Thereby, the recording data based on the digital recording format which is applied to the first magnetic tape can keep a practically sufficient C/N ratio and can be recorded on the magnetic tape for a long time. Thus, the magnetic recording method capable of improving the performance can be realized.

Furthermore, according to the present invention, the magnetic reproduction device is provided with the reproduction means for reproducing recording data from the second magnetic tape having a width wider than the first magnetic tape on which the recording data based on the digital recording format which is applied to the first magnetic tape having a predetermined width are recorded. And the reproduction means successively reproduces the recording data for at least two tracks in the digital recording format from each track formed at a predetermined track pitch set based on the recording time and the reproduction signal characteristic. Thereby, the recording data based on the digital recording format which is applied to the first magnetic tape can keep a practically sufficient C/N ratio and at the same time, can be reproduced from the second magnetic tape for a long time. Thus, the magnetic reproduction device capable of improving the performance can be obtained.

Furthermore, according to the present invention, in the magnetic reproduction method, in the case of reproducing recording data from the second magnetic tape having a width wider than the first magnetic tape on which the recording data based on the digital recording format which is applied to the first magnetic tape having a predetermined width are recorded, the recording data for at least two tracks in the digital recording format are to be successively reproduced from each track formed at a predetermined track pitch set based on the recording time and the reproduction signal characteristic. Thereby, the recording data based on the digital recording format which is applied to the first magnetic tape can keep a practically sufficient C/N ratio and can be reproduced from the second magnetic tape for a long time. Thus, the magnetic reproduction method capable of improving further the performance can be realized.

Furthermore, according to the present invention, in the tape recording medium comprised of the second magnetic tape having a width wider than the first magnetic tape on which recording data based on the digital recording format which is applied to the first magnetic tape having a predetermined width are recorded, tracks are successively and obliquely formed at the predetermined track pitch set based on the recording time and reproduction signal characteristic along the longitudinal direction of the second magnetic tape, and recording data for at least two tracks in the digital recording format are successively recorded as a single track. Thereby, the recording data based on the digital recording format which is applied to the first magnetic tape can keep a practically sufficient C/N ratio and can be recorded for a long time. And thus, the tape recording medium capable of improving the performance can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A magnetic recording device comprising:

recording data generating means for generating recording data based on a digital recording format which is applied to a first magnetic tape having a predetermined tape width; and recording means for successively and obliquely generating tracks in the longitudinal direction of a second magnetic tape having a width wider than said first magnetic tape and for continuously recording said recording data for at least two tracks in said digital recording format on said each track, wherein said recording means forms said tracks at a predetermined track pitch set based on the recording time and the reproduction signal characteristic.

2. The magnetic recording device according to claim 1, wherein:

said first magnetic tape is a magnetic tape for recording said recording data comprised of a digital signal in said digital recording format;

said second magnetic tape is a magnetic tape for recording an analog signal in the data format according to the prescribed analog recording system; and said track pitch has a lower limit set based on said recording time and an upper limit set based on said reproduction signal characteristic.

3. The magnetic recording device according to claim 2, wherein said track pitch is selected based on the running speed of said second magnetic tape, an angle of inclination of said track with respect to the longitudinal direction of said second magnetic tape, and the rotation speed of a rotary drum on which a magnetic head for recording said recording data is loaded and the number of tracks on which said rotary drum records during one revolution.

4. The magnetic recording device according to claim 3, wherein said track pitch is set to 16.34 µm.

5. A magnetic recording method comprising:

a first step of generating recording data based on digital recording format which is applied to a first magnetic tape having a predetermined tape width; and a second step of successively and obliquely generating tracks in the longitudinal direction of a second magnetic tape having a width wider than said first magnetic tape and of continuously recording said recording data for at least two tracks in said digital recording format on said each track, wherein said second step forms said tracks at a predetermined track pitch set based on the recording time and reproduction signal characteristic.

6. The magnetic recording method according to claim 5, wherein said first magnetic tape is a magnetic tape for recording said recording data comprised of a digital signal in said digital recording format;

said second magnetic tape is a magnetic tape for recording an analog signal in the data format according to a predetermined analog recording system; and said track pitch has a lower limit set based on said recording time and an upper limit set based on said reproduction signal characteristic.

7. The magnetic recording method according to claim 6, wherein said track pitch is selected based on the running speed of said second magnetic tape, an angle of inclination of said track with respect to the longitudinal direction of said second magnetic tape, and the rotation speed of a rotary drum on which a magnetic head for recording said recording data is loaded and the number of tracks on which said rotary drum records during one revolution.

8. The magnetic recording method according to claim 7, wherein said track pitch is set to 16.34 µm.

9. A magnetic reproduction device comprising reproduction means for reproducing recording data from a second magnetic tape having a width wider than a first magnetic tape on which recording data based on a digital recording format which is applied to said first magnetic tape having a predetermined tape width is recorded, wherein said reproduction means continuously reproduces said recording data for at least two tracks in said digital recording format from each track formed sequentially and obliquely at a predetermined track pitch set based on the recording time and reproduction signal characteristic along the longitudinal direction of said second magnetic tape.

10. The magnetic reproduction device according to claim 9, wherein:

said first magnetic tape is a magnetic tape for recording said recording data comprised of a digital signal in said digital recording format;

said second magnetic tape is a magnetic tape for recording an analog signal in a data format according to a predetermined analog recording system; and said track pitch has a lower limit set based on the recording time and an upper limit set based on said reproduction signal characteristic.

11. The magnetic reproduction device according to claim 10, wherein said track pitch is selected based on the running speed of said second magnetic tape, an angle of inclination of said track with respect to the longitudinal direction of said second magnetic tape, and the rotation speed of a rotary drum on which a magnetic head for recording said recording data is loaded and the number of tracks on which said rotary drum records during one revolution.

12. The magnetic reproduction device according to claim 11, wherein said track pitch is set to 16.34 µm.

13. A magnetic reproduction method, wherein in the case of reproducing recording data from a second magnetic tape having a width wider than a first magnetic tape on which said recording data based on a digital recording format which is applied to said first magnetic tape having a prescribed tape width is recorded, said recording data for at least two tracks in said digital recording format is continuously reproduced from each track successively and obliquely formed at a predetermined track pitch set based on the recording time and reproduction signal characteristic in the longitudinal direction of said second magnetic tape.

14. The magnetic reproduction method according to claim 13, wherein:

said first magnetic tape is a magnetic tape for recording said recording data comprised of a digital signal in said digital recording format;

said second magnetic tape is a magnetic tape for recording an analog signal in a data format according to a predetermined analog recording system; and said track pitch has a lower limit set based on said recording time and an upper limit set based on said reproduction signal characteristic.

15. The magnetic reproduction method according to claim 14, wherein said track pitch is selected based on the running speed of said second magnetic tape, an angle of inclination of said track with respect to the longitudinal direction of said second magnetic tape, and the rotation speed of a rotary drum on which a magnetic head for recording said recording data is loaded and the number of tracks on which said rotary drum records during one revolution.

16. The magnetic reproduction method according to claim 15, wherein said track pitch is set to 16.34 $\mu$m.

* * * * *